United States Patent
Shulman et al.

(10) Patent No.: US 11,113,197 B2
(45) Date of Patent: Sep. 7, 2021

(54) PUNCTUATION CONTROLLED TEMPORAL REFERENCE DATA LOOKUP

(71) Applicant: Microsoft Technology Licensing, LLC, Redmond, WA (US)

(72) Inventors: Boris Shulman, Sammamish, WA (US); Shoupei Li, Sammamish, WA (US); Alexander Alperovich, Redmond, WA (US); Xindi Zhang, Kirkland, WA (US); Kanstantsyn Zoryn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 16/378,426

(22) Filed: Apr. 8, 2019

(65) Prior Publication Data
US 2020/0320005 A1    Oct. 8, 2020

(51) Int. Cl.
*G06Q 30/02*    (2012.01)
*G06F 12/0842*    (2016.01)

(52) U.S. Cl.
CPC .. *G06F 12/0842* (2013.01); *G06F 2212/1016* (2013.01); *G06F 2212/608* (2013.01)

(58) Field of Classification Search
CPC .................................................. G06Q 30/0246
See application file for complete search history.

(56) References Cited

U.S. PATENT DOCUMENTS

| | | | | |
|---|---|---|---|---|
| 2003/0204678 A1* | 10/2003 | Lee | ........................ | H04L 67/10 711/144 |
| 2006/0074970 A1* | 4/2006 | Narayanan | .......... | G06F 11/3452 |
| 2007/0288459 A1* | 12/2007 | Kashiyama | ............. | G06F 16/20 |
| 2013/0066855 A1* | 3/2013 | Gupta | ................... | G06F 16/951 707/722 |
| 2015/0199712 A1* | 7/2015 | Radziwonczyk-Syta | ..................... | G06Q 30/0246 705/14.45 |
| 2016/0357476 A1* | 12/2016 | Chen | ...................... | G06F 3/0604 |
| 2018/0121516 A1* | 5/2018 | Ohtsuji | ............... | G06F 16/2465 |
| 2018/0322170 A1 | 11/2018 | Alberton et al. | | |

OTHER PUBLICATIONS

Nalamwar, Anu, "Blocking Operators and Punctuated Data Streams in Continuous Query Systems", In a report submitted in partial satisfaction for the MS degree in Computer Science, UCLA, Feb. 1, 2003, pp. 1-19.

"International Search Report and Written Opinion Issued in PCT Application No. PCT/US2020/024803", dated Jun. 29, 2020, 14 Pages.

* cited by examiner

*Primary Examiner* — Ryan Bertram
*Assistant Examiner* — Trang K Ta
(74) *Attorney, Agent, or Firm* — Ray Quinney & Nebeker; Thomas M. Hardman; Timothy J. Churna

(57) ABSTRACT

A method for joining an event stream with reference data includes loading a plurality of reference data snapshots from a reference data source into a cache. Punctuation events are supplied that indicate temporal validity for the plurality of reference data snapshots in the cache. A logical barrier is provided that restricts a flow of data events in the event stream to a cache lookup operation based on the punctuation events. The cache lookup operation is performed with respect to the data events in the event stream that are permitted to cross the logical barrier.

18 Claims, 8 Drawing Sheets

PUNCTUATION CONTROLLED TEMPORAL REFERENCE DATA LOOKUP

CROSS-REFERENCE TO RELATED APPLICATIONS

N/A

BACKGROUND

Event stream processing refers to the process of quickly analyzing time-based data, such as time series data. In the context of event stream processing, the term "event" refers to any occurrence that happens at a defined time and can be recorded using one or more data fields. An "event stream" is a sequence of multiple data events, which may be ordered by time. Some examples of different types of event streams include Internet of Things (IoT) data (e.g., sensor data, signals from control systems, location information), business transactions (e.g., customer orders, bank deposits, invoices), and information reports (e.g., social media updates, market data, weather reports).

With traditional approaches, data is typically processed after it has been stored. Advantageously, event stream processing allows data to be analyzed as it is being created and before it is stored. For example, data may be analyzed when it is streaming from one device to another. This allows for faster reaction time and may even provide an opportunity for proactive measures to be taken.

Event stream processing may be utilized to identify meaningful patterns or relationships within event streams in order to detect relationships like event correlation, causality, or timing. There are a wide variety of industries that can benefit from event stream processing, including network monitoring, cybersecurity, retail optimization, surveillance, fraud detection, financial trading, and e-commerce.

In a system that is configured for event stream processing, it may sometimes be desirable to join incoming data in an event stream with reference data that provides additional information about the event stream. Consider an example involving a stream of temperature readings coming from a thermostat. It may be desirable to perform a join operation with respect to the thermostat's device identifier (ID) and a table containing information about thermostats in order to retrieve the thermostat's friendly name, location in a building, and so on. An operation in which an event stream is joined with reference data may be referred to herein as a reference data join operation.

When performing a reference data join operation, one challenge is that the reference data itself can slowly change. For example, the location associated with a thermostat in the reference data may be updated after the thermostat is physically moved to a new place. This presents at least two challenges. First, when reference data is updated at time t, the value(s) joined with an event associated with time t should also be refreshed, and the stale value(s) should not be used. Second, a reference data join operation between events and reference data should be repeatable. For example, data associated with a thermostat reading at a particular time should always be joined with the same definition of the reference data. If a reference data join operation is performed with respect to temperature readings that pre-date the change (e.g., during re-processing of events), those older temperature readings should be joined with the old location.

In addition to correctness, low latency is also a desirable attribute when performing a reference data join operation. As the size of the reference data increases, however, it becomes increasingly difficult to achieve low latency while also providing correct results. In many current applications, the size of reference data can be quite large (e.g., hundreds of gigabytes or larger).

SUMMARY

In accordance with one aspect of the present disclosure, a method for joining an event stream with reference data includes loading a plurality of reference data snapshots from a reference data source into a cache. Punctuation events that indicate temporal validity for the plurality of reference data snapshots in the cache are supplied. A logical barrier that restricts a flow of data events in the event stream to a cache lookup operation based on the punctuation events is provided. The cache lookup operation is performed with respect to the data events in the event stream that are permitted to cross the logical barrier.

In some embodiments, providing the logical barrier includes performing a temporal union between the punctuation events and the event stream.

In some embodiments, a punctuation event includes a punctuation event timestamp that indicates a latest point in time for which there is a valid reference data snapshot in the cache. Each data event in the event stream having a timestamp that is less than or equal to the punctuation event timestamp may be permitted to cross the logical barrier. Each data event in the event stream having a timestamp that is greater than the punctuation event timestamp may be prevented from crossing the barrier.

In some embodiments, the method also includes dynamically updating contents of the cache based on processing of data events in the event stream.

In some embodiments, the cache lookup operation may be performed by a compute processor in a stream processing node. The punctuation events may be supplied to the compute processor by a reference data manager in response to data requests sent by the compute processor. The method may additionally include determining whether to add one or more new reference data snapshots to the cache based at least in part on the data requests. A new reference data snapshot may be added to the cache when a difference between a punctuation event timestamp and a timestamp that is associated with a most recent data request sent by the compute processor is less than a predefined threshold value.

In some embodiments, the method may additionally include determining whether to delete one or more older reference data snapshots from the cache based at least in part on lookup requests that the compute processor sends to a reference data manager as part of the cache lookup operation. A reference data snapshot may be deleted from the cache when a difference between a timestamp that is included in a most recent lookup request that the compute processor sends to the reference data manager and an end time of a valid time range associated with the reference data snapshot is greater than a predefined threshold value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
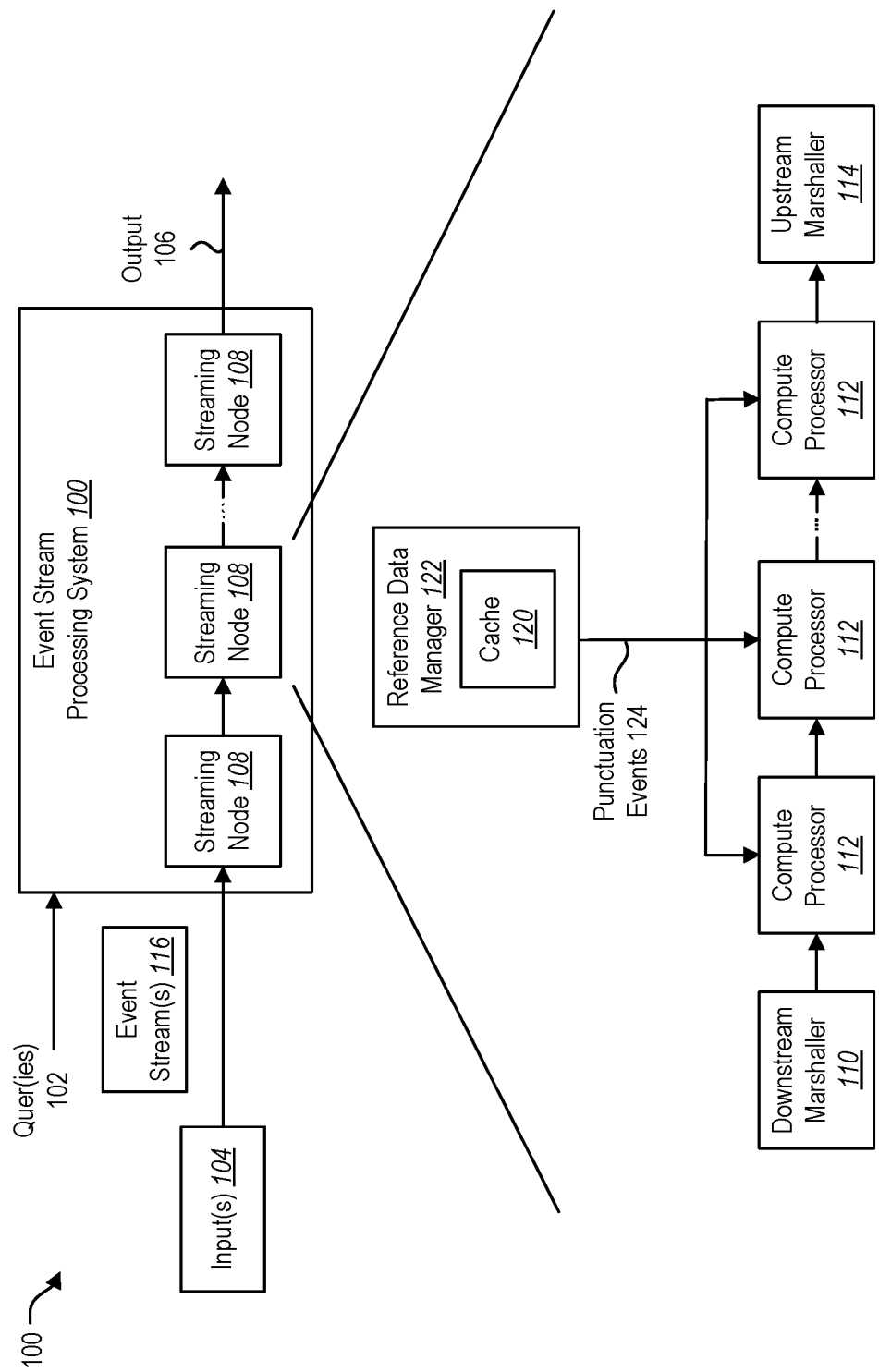
FIG. 1 illustrates an example of an event stream processing system in which the techniques disclosed herein may be utilized.

The present disclosure is generally related to a method for joining an event stream with reference data. Advantageously, the techniques disclosed herein provide accurate results while achieving low latency, even when the size of the reference data is quite large.

The techniques disclosed herein utilize a cache lookup operation. In other words, when joining an event stream with reference data, the reference data may be obtained from a cache. Obtaining the reference data via a cache lookup operation is significantly faster than performing input/output operations with respect to the reference data source itself, thereby reducing the amount of latency involved.

The cache may include a plurality of reference data snapshots. In this context, the term "snapshot" refers to a representation of the reference data at a particular point in time. A valid time range may be associated with each reference data snapshot. The valid time range associated with a particular reference data snapshot may include a start time and an end time. A reference data snapshot is an accurate representation of the reference data between the start time and the end time of the valid time range that is associated with the reference data snapshot. However, the reference data snapshot may not accurately represent the reference data prior to the start time or after the end time of the valid time range.

The contents of the cache may be updated dynamically based on the processing of the events in the event stream. As events in the event stream progress in time, additional reference data snapshots from later time periods may be added to the cache, and older reference data snapshots that are no longer needed may be deleted from the cache.

A reference data manager supplies punctuation events that provide information about the temporal validity of the plurality of reference data snapshots in the cache. For example, each punctuation event may indicate the latest point in time for which there is a valid reference data snapshot in the cache.

A logical barrier is implemented to restrict the flow of events to the cache lookup operation based on the information contained in the punctuation events. Data events for which there is a valid reference data snapshot in the cache are allowed to pass through the logical barrier to a cache lookup operation. However, data events for which there is not a valid reference data snapshot in the cache are prevented from passing through the logical barrier until the punctuation events indicate that the cache has been updated to include a valid reference data snapshot.

The logical barrier may be implemented as a temporal union between the event stream and the punctuation events. This temporal union operation may be logically placed prior to the cache lookup operation. As a result of the temporal union operation, the cache lookup operation is performed on data events having a timestamp that is less than or equal to the timestamp indicated by the most recent punctuation event. However, the cache lookup operation is not immediately performed on any data events having a timestamp that is greater than the timestamp indicated by the most recent punctuation event. The temporal union operation delays the cache lookup operation on any such data events until one or more additional punctuation events are received and the timestamps associated with those data events are less than or equal to the timestamp indicated by the most recent punctuation event.

For example, suppose that the most recent punctuation event indicates that the highest timestamp associated with any of the reference data snapshots in the cache is $t_N$. The temporal union operation would allow a data event that is associated with a timestamp of $t_{N-1}$ to proceed to the cache lookup operation (assuming that $t_{N-1}$ occurs earlier in time than $t_N$). However, as a result of the temporal union operation, a data event that is associated with a timestamp of $t_{N+1}$ would not immediately proceed to the cache lookup operation. Such a data event would be prevented from proceeding to the cache lookup operation until a punctuation event indicates that the highest timestamp associated with any of the reference data snapshots in the cache is (at least) $t_{N+1}$, thereby indicating that a reference data snapshot that is valid for the time $t_{N+1}$ has been loaded into the cache.

FIG. 1 illustrates an example of an event stream processing system 100 in which the techniques disclosed herein may be utilized. The event stream processing system 100 may be configured to receive and respond to queries 102, which may be provided as input from a user. In response to one or more queries 102, the event stream processing system 100 may ingest one or more event streams 116 from one or more inputs 104, process the event stream(s) 116 in accordance with the quer(ies) 102, and generate output 106.

The event stream processing system 100 includes a plurality of streaming nodes 108. Each of the streaming nodes 108 may be configured to perform one or more processing operations, and the streaming nodes 108 may be interconnected to implement the desired processing of the event stream(s) 116 ingested from the input(s) 104. For simplicity, the streaming nodes 108 are shown as being connected serially. However, the structure of the event stream processing system 100 shown in FIG. 1 is provided for purposes of example only, and should not be interpreted as limiting the scope of the techniques disclosed herein. More complex topologies are possible in accordance with the present disclosure.

FIG. 1 also shows some of the components that may be included in a streaming node 108. Specifically, a streaming node 108 is shown with a downstream marshaller 110, a plurality of compute processors 112, and an upstream marshaller 114. The downstream marshaller 110 may be configured to pull data from an upstream marshaller in a prior streaming node 108. The compute processors 112 may each be configured to perform one or more processing operations, and they may be interconnected in various ways to implement the desired processing of the event stream(s) 116. For simplicity, the compute processors 112 are shown as being connected serially. Again, however, more complex topologies are possible in accordance with the present disclosure.

One of the processing operations that may be performed by a compute processor (including any of the compute processors 112 shown in FIG. 1) is a reference data join operation. As discussed above, the techniques disclosed herein utilize a cache lookup operation in which the reference data is obtained from a cache 120. The cache 120 may include a plurality of reference data snapshots. In accordance with the present disclosure, a reference data manager 122 supplies punctuation events 124 that provide information about the temporal validity of the reference data snapshots in the cache 120. As will be described in greater detail below, the compute processors 112 may use the punctuation events 124 to implement a logical barrier that restricts the flow of data events to the cache lookup operation.

Figure 2:
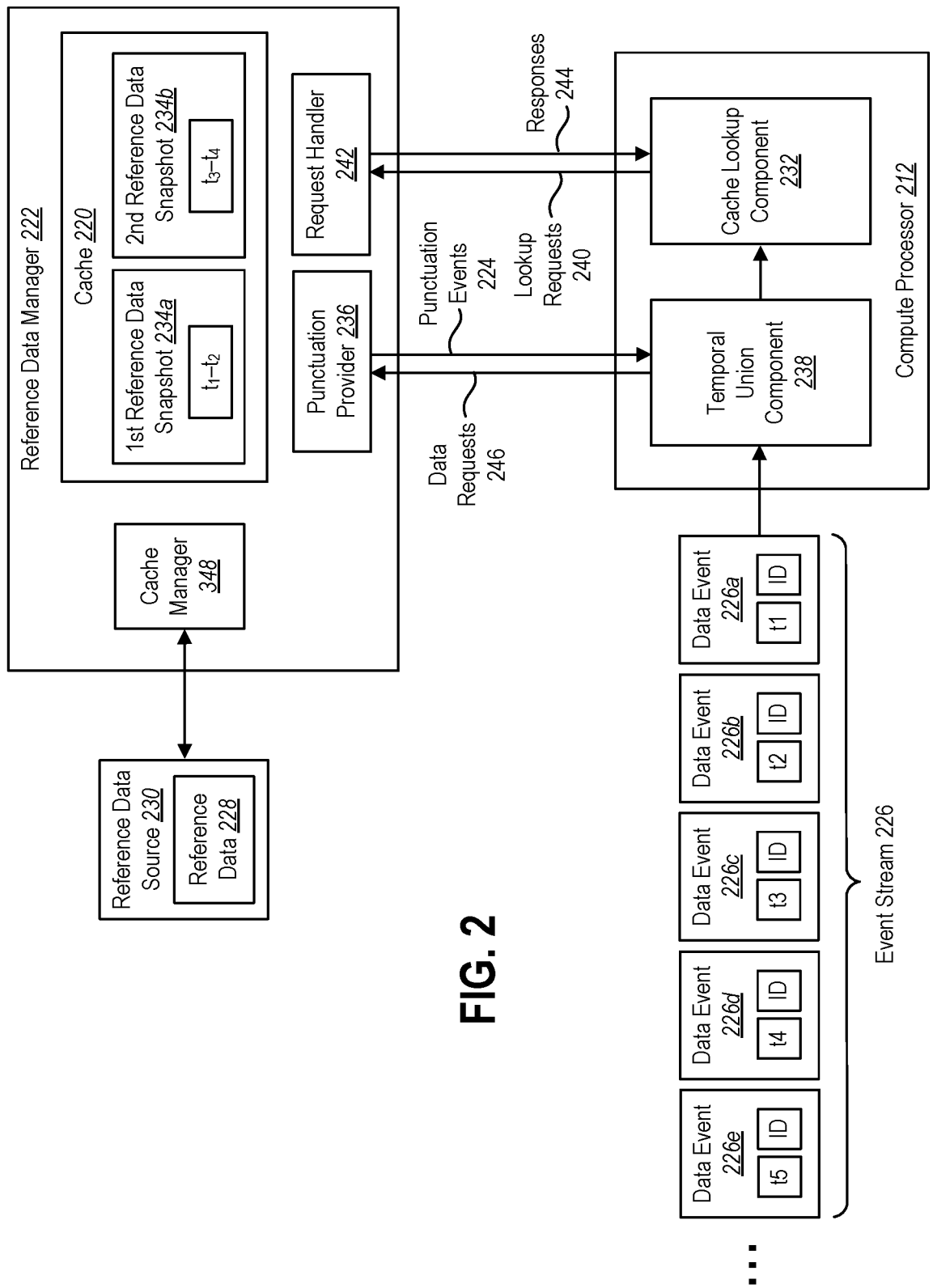
FIG. 2 illustrates an example showing how a compute processor may utilize a punctuation event provided by a reference data manager to implement a logical barrier to a cache lookup operation in accordance with the present disclosure.

FIG. 2 illustrates an example showing how a compute processor 212 may utilize a punctuation event 224 provided by a reference data manager 222 to implement a logical barrier to a cache lookup operation in accordance with the present disclosure.

The compute processor 212 is configured to perform a reference data join operation. As indicated above, a reference data join operation is a join operation between an event stream 226 and reference data 228. The event stream 226 includes time series data. More specifically, the event stream 226 includes a plurality of data events 226a-e. Each of the data events 226a-e is associated with a timestamp and an ID. For example, if the data events 226a-e represent temperature readings coming from a thermostat, then each of the data events 226a-e may include a thermostat ID. Although the reference data 228 is not time series data, the reference data 228 may nonetheless change from time to time, as discussed above. The reference data 228 is provided by a reference data source 230. There are many different types of reference data sources 230 that may be used in accordance with the present disclosure. For example, in some embodiments the reference data source 230 may be a relational database, and the reference data 228 may include one or more database files. As another example, the reference data source 230 may be a cloud storage system, and the reference data 228 may include one or more files that are stored within the cloud storage system. Those skilled in the art will recognize other types of reference data sources 230 that may be used in accordance with the present disclosure.

To perform the reference data join operation, the compute processor 212 performs a cache lookup operation. The cache lookup operation is performed for data events 226a-e in the event stream 226. When the cache lookup operation is performed for a specific data event, the cache lookup operation identifies any information in the cache 220 that corresponds to the ID associated with the data event. Continuing with the previous example, if the data events 226a-e represent temperature readings coming from a thermostat and each of the data events 226a-e includes a thermostat ID, then the cache lookup operation involves identifying any information in the cache 220 that is associated with that thermostat ID (e.g., the thermostat's friendly name, location in a building). The compute processor 212 is shown with a cache lookup component 232 that performs the cache lookup operation.

In the depicted example, a first reference data snapshot 234a and a second reference data snapshot 234b are stored in the cache 220. The first reference data snapshot 234a is associated with a valid time range of $t_1$-$t_2$, and the second reference data snapshot 234b is associated with a valid time range of $t_3$-$t_4$.

In the examples discussed herein, all references to $t_i$ (where i is any integer) are referring to a point in time. Unless otherwise specified, $t_x$ occurs earlier in time than $t_y$ if y>x. For example, $t_1$ occurs earlier in time than $t_2$. However, the difference between two different time values (e.g., the difference between $t_2$ and $t_1$) should not be interpreted as corresponding to any particular time interval. The difference between $t_x$ and $t_y$ may be the same as or different than the difference between $t_y$ and $t_z$. For example, the difference between $t_2$ and $t_1$ may be the same as or different than the difference between $t_3$ and $t_2$.

The compute processor 212 and the reference data manager 222 may be time synchronized such that any timestamp that is exchanged between those entities will be interpreted by both entities as referring to the same point in time. For example, if the reference data manager 222 returns a punctuation event 224 of $t_N$ to the compute processor 212, both the reference data manager 222 and the compute processor 212 interpret $t_N$ as referring to the same point in time. In fact, referring briefly to the event stream processing system 100 shown in FIG. 1, all of the compute processors 112 within a streaming node 108 may be time synchronized. In some embodiments, all of the streaming nodes 108 within the event stream processing system 100 may be time synchronized.

Referring once again to the example shown in FIG. 2, the reference data manager 222 supplies punctuation events 224 that provide information about the temporal validity of the reference data snapshots 234a-b in the cache 220. In other words, the punctuation events 224 indicate the time period for which there are valid reference data snapshots 234a-b stored in the cache 220. The reference data manager 222 is shown with a punctuation provider 236 that supplies the punctuation events 224.

Each punctuation event 224 that is supplied by the reference data manager 222 may include a timestamp that corresponds to the highest timestamp (i.e., the timestamp that is latest in time) associated with the reference data snapshots 234a-b in the cache 220. For example, with the contents of the cache 220 as shown in FIG. 2, the punctuation provider 236 may supply a punctuation event 224 that includes the timestamp $t_4$, which corresponds to the end time of the valid time range of the second reference data snapshot 234b.

The compute processor 212 implements a logical barrier to restrict the flow of data events 226a-e to the cache lookup operation based on the information contained in the punctuation events 224 supplied by the reference data manager 222. As shown in FIG. 2, the logical barrier may be implemented as a temporal union between the event stream 226 and the punctuation events 224. The compute processor 212 is shown with a temporal union component 238 that performs the temporal union operation.

The temporal union operation is logically placed prior to the cache lookup operation in the compute processor 212. In other words, the compute processor 212 is configured so that the event stream 226 is processed by the temporal union component 238 before being processed by the cache lookup component 232. As a result of the temporal union operation, the cache lookup operation is only performed on data events for which there is a valid reference data snapshot in the cache 220.

More specifically, each data event in the event stream 226 having a timestamp that is greater than the timestamp in the most recent punctuation event 224 (which, as indicated above, corresponds to the highest timestamp associated with the reference data snapshots 234a-b in the cache 220) is prevented from crossing the logical barrier to the cache lookup operation performed by the cache lookup component 232. However, each data event in the event stream 226 having a timestamp that is less than or equal to the timestamp in the most recent punctuation event 224 is allowed to cross the logical barrier and proceed to the cache lookup operation performed by the cache lookup component 232.

As indicated above, with the contents of the cache 220 as shown in FIG. 2, the punctuation provider 236 may supply a punctuation event 224 that includes the timestamp $t_4$. In this case, the temporal union operation performed by the temporal union component 238 would allow the events 226a-d that are associated with timestamps $t_1$, $t_2$, $t_3$, and $t_4$, respectively, to proceed to the cache lookup operation performed by the cache lookup component 232.

When a cache lookup operation is performed for a particular data event, the cache lookup component 232 sends a lookup request 240 to a request handler 242 within the reference data manager 222. The request handler 242 retrieves the reference data that should be joined with the data event from the appropriate reference data snapshot (namely, the reference data snapshot that has a valid time range corresponding to the data event's timestamp) and returns that reference data to the cache lookup component 232 via a response 244. In the depicted example, when a cache lookup operation is performed for the data events 226a-b associated with timestamps $t_1$ and $t_2$, respectively, the reference data is retrieved from the reference data snapshot 234a that is valid between timestamps $t_1$-$t_2$. When a cache lookup operation is performed for the data events 226c-d associated with timestamps $t_3$ and $t_4$, respectively, the reference data is retrieved from the reference data snapshot 234b that is valid between timestamps $t_3$-$t_4$.

As a result of the temporal union operation, the data event 226e that is associated with a timestamp of $t_5$ would not immediately proceed to the cache lookup operation. The temporal union component 238 would prevent the data event 226e from proceeding to the cache lookup operation until the temporal union component 238 receives a punctuation event 224 having a timestamp of (at least) $t_5$, thereby indicating that a reference data snapshot that is valid for the time $t_5$ has been loaded into the cache 220.

The punctuation events 224 may be provided in response to requests 246 for data from the temporal union component 238. For example, the reference data manager 222 may be configured so that whenever it receives a data request 246 from the temporal union component 238, the punctuation provider 236 responds to the data request 246 by returning a punctuation event 224 to the temporal union component 238.

Figure 3A:
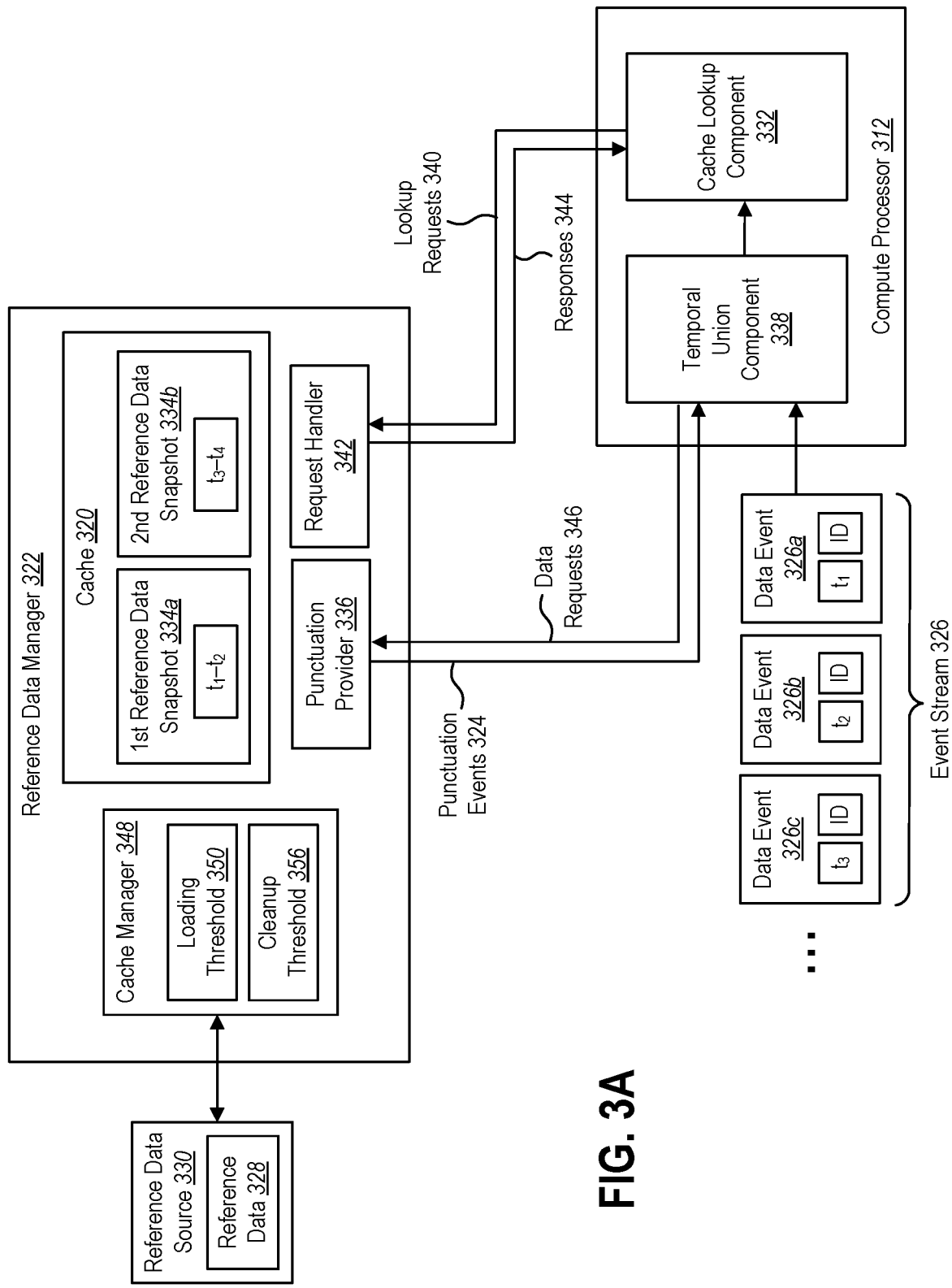
FIGS. 3A-C illustrate how the contents of a cache may be updated dynamically based on the processing of an event stream.
Figure 3B:
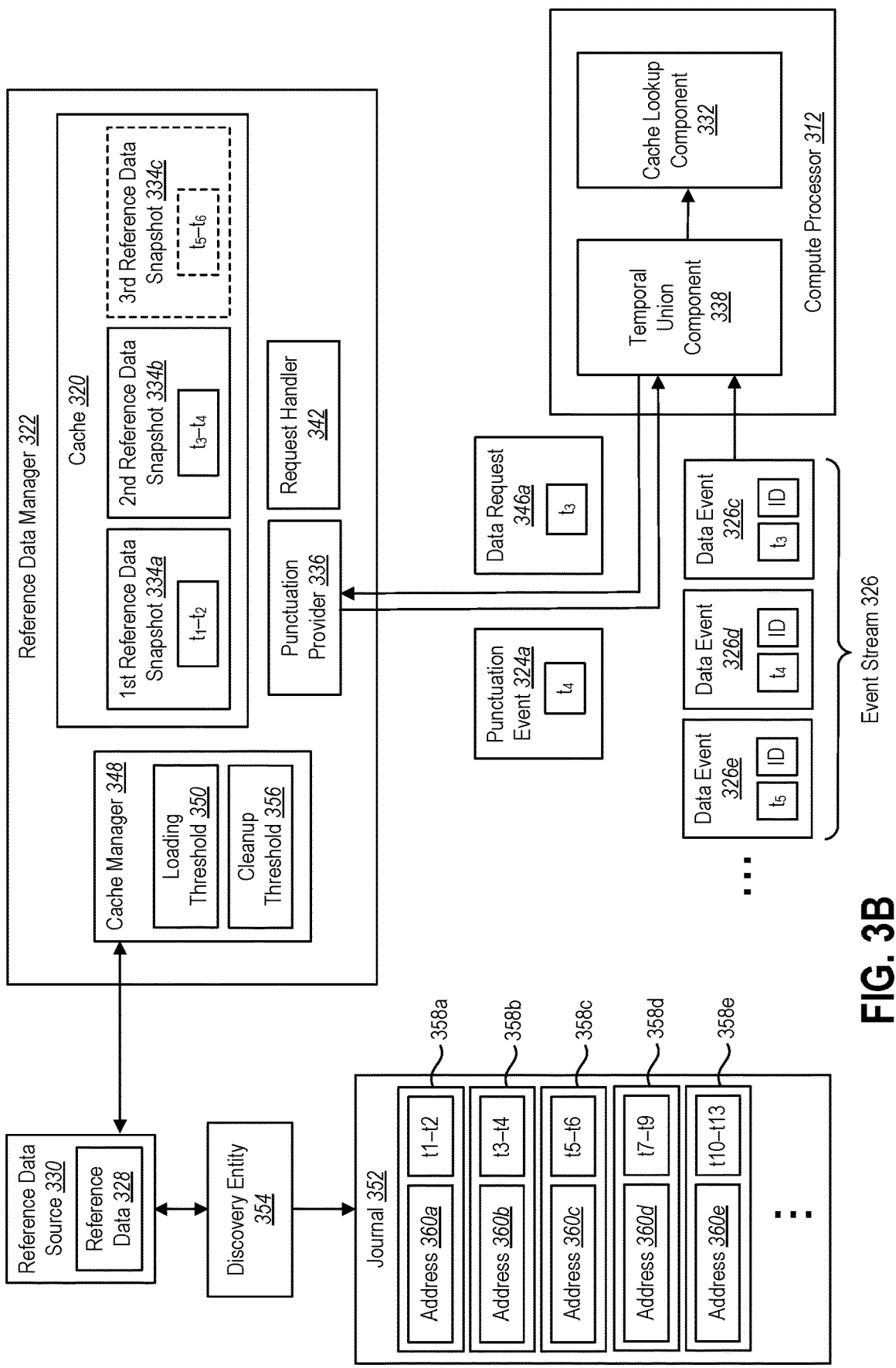
Figure 3C:
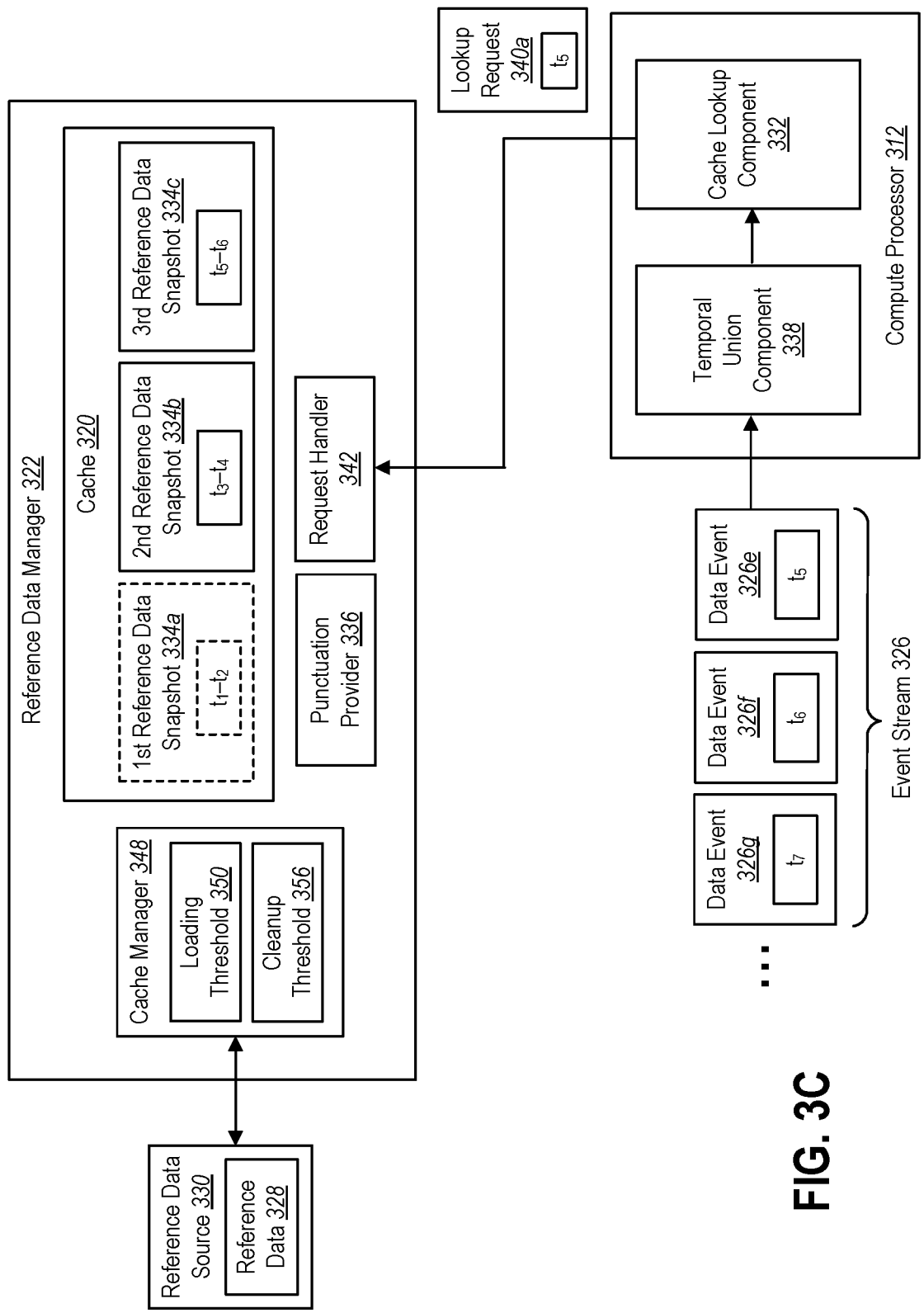

FIGS. 3A-C illustrate an example showing additional aspects of a reference data join operation in accordance with the present disclosure. More specifically, FIGS. 3A-C illustrate how the contents of a cache 320 may be updated dynamically based on the processing of an event stream 326.

FIGS. 3A-C illustrate successive points in time. That is, FIG. 3A illustrates a particular point in time, and the point in time shown in FIG. 3B occurs after the point in time shown in FIG. 3A. Similarly, the point in time shown in FIG. 3C occurs after the point in time shown in FIG. 3B. Taken together, FIGS. 3A-C illustrate the processing of a plurality of data events 326a-g. Some data events 326a-c are shown in FIG. 3A, some data events 326c-e are shown in FIG. 3B, and some other data events 326e-g are shown in FIG. 3C.

As before, the reference data join operation involves the use of a cache 320 that includes a plurality of reference data snapshots. At the point in time that is shown in FIG. 3A, there are two reference data snapshots 324a-b in the cache 320. A compute processor 312 uses punctuation events 324 supplied by a reference data manager 322 to implement a logical barrier to restrict the flow of data events 326a-g in the event stream 326 to a cache lookup operation performed by a cache lookup component 332. The logical barrier may be implemented as a temporal union between the event stream 326 and the punctuation events 324. The compute processor 312 is shown with a temporal union component 338 that performs the temporal union operation.

Additional reference data snapshots from later time periods may be added to the cache 320 based on the processing of the data events 326a-g in the event stream 326. In addition, older reference data snapshots that are no longer needed may be deleted from the cache 320. The reference data manager 322 includes a cache manager 348 that adds new reference data snapshots to the cache 320 and deletes old reference data snapshots from the cache 320. The decision to add one or more new reference data snapshots to the cache 320 may be based at least in part on the data requests 346 that the temporal union component 338 sends to the reference data manager 322. The decision to delete one or more older reference data snapshots from the cache 320 may be based at least in part on the lookup requests 340 that the cache lookup component 332 sends to the request handler 342.

Referring now to FIG. 3B, the decision to add one or more new reference data snapshots to the cache 320 may be based on the difference between (i) the highest timestamp that is associated with any of the reference data snapshots 334a-b in the cache 320 (as indicated, for example, by the most recent punctuation event 324a that the punctuation provider 336 sends to the temporal union component 338), and (ii) the timestamp that is included in the most recent data request 346a that the temporal union component 338 sends to the reference data manager 322. If the difference between these timestamps is less than a predefined threshold value (which may be referred to herein as a loading threshold 350), then the cache manager 348 may load one or more new reference data snapshots to the cache 320.

For example, FIG. 3B shows the temporal union component 338 sending a data request 346a having a timestamp of $t_3$ to the reference data manager 322. This indicates that the temporal union component 338 is currently processing a data event 326c that has a timestamp of $t_3$. In addition, it will be assumed that $t_4$ is the highest timestamp associated with any of the reference data snapshots 334a-b in the cache 320 at the point in time that the data event 326c is processed, as indicated by the most recent punctuation event 324a that the punctuation provider 336 returns to the temporal union component 338. If the difference between $t_4$ and $t_3$ is less than the loading threshold 350, then the cache manager 348 retrieves one or more new reference data snapshots from the reference data source 330 and loads the reference data snapshot(s) into the cache 320. FIG. 3B shows the cache 320 with a third reference data snapshot 334c having a valid time range of $t_5$-$t_6$. This new reference data snapshot 334c is shown in dotted lines to indicate that it is being newly added to the cache 320.

To load the reference data snapshot 334c into the cache 320, the cache manager 348 may refer to a journal 352 that is prepared by a discovery entity 354. The discovery entity 354 may periodically scan the reference data source 330 for changes to the reference data 328. Whenever the discovery entity 354 determines that the reference data 328 has changed, the discovery entity 354 creates another record in the journal 352. In the depicted example, the journal 352 includes a plurality of records 358a-e corresponding to various reference data snapshots (including, but not limited to, the reference data snapshots 334a-b in the cache 320). The records 358a-e include address information 360a-e indicating where the corresponding reference data snapshots may be found in the reference data source 330. Each of the records 358a-e is also associated with a valid time range.

When the cache manager 348 determines that a new reference data snapshot should be loaded into the cache 320, the cache manager 348 searches the journal 352 for the record with the appropriate valid time range. In the example shown in FIG. 3A, the highest timestamp associated with the reference data snapshots 334a-b in the cache 320 is $t_4$. The cache manager 348 searches the journal 352 for a record 358c whose valid time range includes the earliest start time that is greater than $t_4$. The cache manager 348 then uses the address information 360c in the record 358c to locate the corresponding reference data snapshot 334c in the reference data source 330 and load that reference data snapshot 334c into the cache 320.

Reference is now made to FIG. 3C. The decision to delete a reference data snapshot from the cache 320 may be based on the difference between (i) the timestamp that is included in the most recent lookup request 340a that the cache lookup component 332 sends to the request handler 342, and (ii) the end time of the valid time range associated with that reference data snapshot. If this difference is greater than a predefined threshold value (which may be referred to herein as a cleanup threshold 356), then the cache manager 348 may delete that reference data snapshot from the cache 320.

FIG. 3C shows the cache lookup component 332 sending a lookup request 340a having a timestamp of $t_5$ to the request handler 342. The end time associated with the oldest reference data snapshot 334a in the cache 320 is $t_2$. If the difference between $t_5$ and $t_2$ is greater than the cleanup threshold 356, then this reference data snapshot 334a may be deleted from the cache 320. This reference data snapshot 334a is shown in dotted lines to indicate that it is being deleted from the cache 320.

Figure 4:
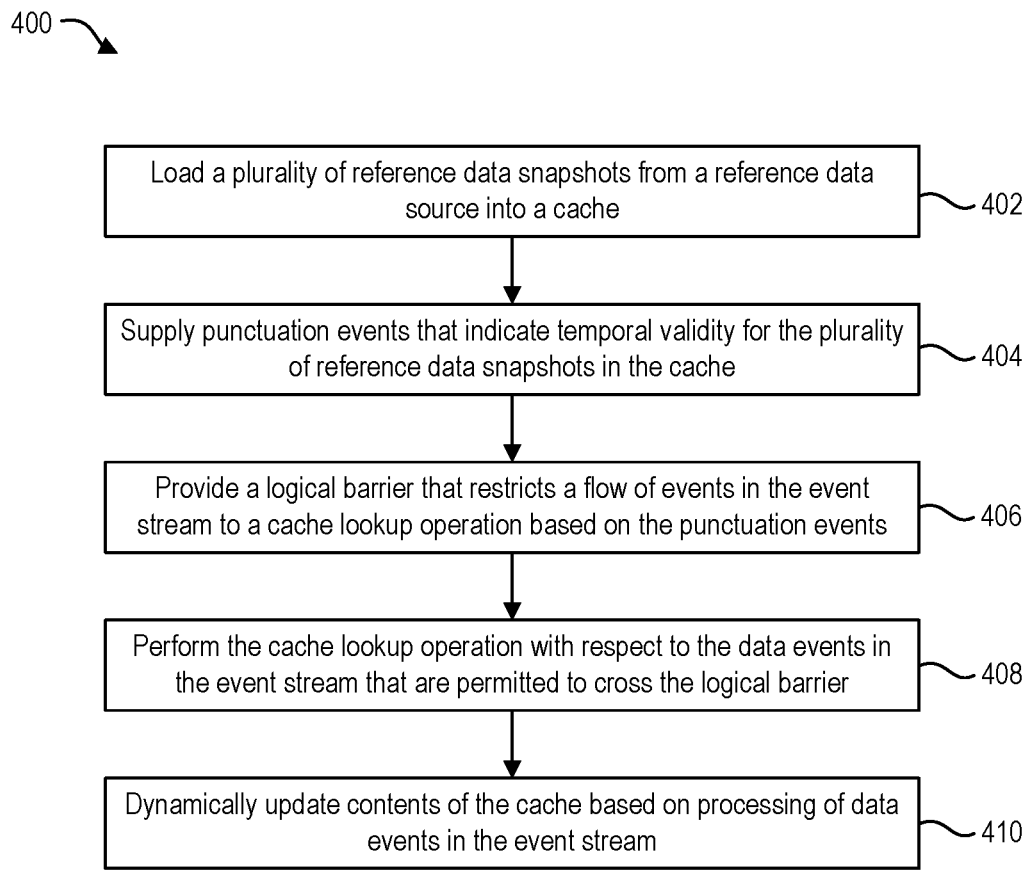
FIG. 4 illustrates an example of a method for joining an event stream with reference data in accordance with the present disclosure.

FIG. 4 illustrates an example of a method 400 for joining an event stream 326 with reference data 328 in accordance with the present disclosure. The method 400 (and other methods discussed subsequently) will be described in relation to some of the systems, devices, components, and data described previously.

Step 402 of the method 400 involves loading a plurality of reference data snapshots 334a-b from a reference data source 330 into a cache 320. This step 402 may be performed by a reference data manager 322, which may be responsible for maintaining the cache 320. The reference data snapshots 334a-b represent the reference data 328 at particular points in time. The reference data snapshots 334a-b may each be associated with a valid time range. For instance, referring to the example shown in FIGS. 3A-C, the first reference data snapshot 334a is associated with a valid time range of $t_1$-$t_2$. This means that the first reference data snapshot 334a is an accurate representation of the reference data 328 between time $t_1$ and time $t_2$. However, the first reference data snapshot 334a may not accurately represent the reference data 328 prior to time $t_1$ or after time $t_2$.

Step 404 of the method 400 involves supplying punctuation events 324 that indicate temporal validity for the plurality of reference data snapshots 334a-b in the cache 320. Each punctuation event 324 may indicate the latest point in time for which there is a valid reference data snapshot in the cache 320. For example, FIG. 3B shows a punctuation event 324a with a timestamp of $t_4$. This means that there is a valid reference data snapshot 334b in the cache 320 up through time $t_4$, but not past time $t_4$. The punctuation events 324 may be supplied by a reference data manager 322 and consumed by one or more compute processors 312. The punctuation events 324 may be supplied in response to data requests 346 from the compute processor(s) 312.

Step 406 of the method 400 involves providing a logical barrier that restricts a flow of data events 326a-g in the event stream 326 to a cache lookup operation based on the punctuation events 324. The logical barrier may be implemented by a compute processor 312. The logical barrier may be implemented as a temporal union operation that is performed between the event stream 326 and the punctuation events 324. The temporal union operation is logically placed prior to the cache lookup operation in the compute processor 312. In other words, the compute processor 312 is configured so that the event stream 326 is processed by a temporal union component 338 (which performs the temporal union operation) before being processed by a cache lookup component 332 (which performs the cache lookup operation). As a result of the temporal union operation, the cache lookup operation is only performed on data events for which there is a valid reference data snapshot in the cache 320.

Step 408 of the method 400 involves performing the cache lookup operation with respect to the data events in the event stream 326 that are permitted to cross the logical barrier. Each data event in the event stream 326 having a timestamp that is greater than the timestamp in the most recent punctuation event 324a is prevented from crossing the logical barrier to the cache lookup operation performed by the cache lookup component 332. However, each data event in the event stream 326 having a timestamp that is less than or equal to the timestamp in the most recent punctuation event 324a is permitted to cross the logical barrier and proceed to the cache lookup operation performed by the cache lookup component 332. Referring again to the example shown in FIGS. 3A-C, the most recent punctuation event 324a is shown with a timestamp of $t_4$. In this case, the temporal union operation performed by the temporal union component 338 would allow the events 326a-d that are associated with timestamps $t_1$, $t_2$, $t_3$, and $t_4$, respectively, to proceed to the cache lookup operation performed by the cache lookup component 332. However, the data event 326e that is associated with a timestamp of $t_5$ would not immediately proceed to the cache lookup operation. The temporal union component 338 would prevent this data event 326e from proceeding to the cache lookup operation until a punctuation event 324 having a timestamp of (at least) $t_5$ is received, thereby indicating that a reference data snapshot that is valid for the time $t_5$ has been loaded into the cache 320.

Step 410 of the method 400 involves dynamically updating contents of the cache 320 based on processing of data events 326a-g in the event stream 326. As events in the event stream 326 progress in time, additional reference data snapshots from later time periods may be added to the cache 320, and older reference data snapshots that are no longer needed may be deleted from the cache.

Figure 5:
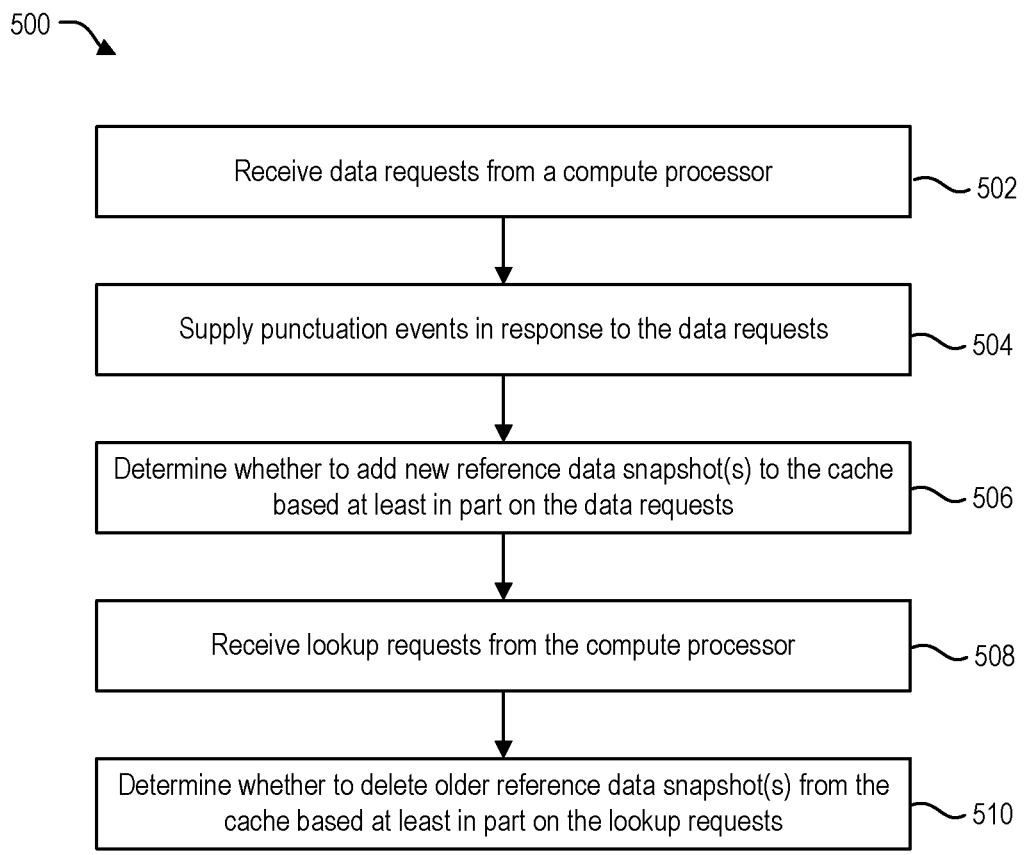
FIG. 5 illustrates an example of a method for dynamically updating contents of a cache based on processing of data events in an event stream.

FIG. 5 illustrates an example of a method 500 for dynamically updating contents of a cache 320 based on processing of data events 326a-g in an event stream 326. The method 500 may be performed by a reference data manager 322. As described above, a reference data manager 322 may be included in a stream processing node 108 within an event stream processing system 100.

Step 502 of the method 500 involves receiving data requests 346 from a compute processor 312 in the stream processing node 108. The compute processor 312 may be configured to perform a reference data join operation (including a temporal union operation and a cache lookup operation) in the manner described above. The compute processor 312 may be configured to send the data requests 346 to the reference data manager 322 in connection with performing the reference data join operation.

Step 504 of the method 500 involves supplying punctuation events 324 in response to the data requests 346. For example, the reference data manager 322 may be configured so that whenever the reference data manager 322 receives a data request 346 from the compute processor 312, the reference data manager 322 responds to the data request 346 by returning a punctuation event 324 to the compute processor 312. As discussed above, the punctuation event 324 includes a timestamp that indicates the latest time for which there is a valid reference data snapshot in the cache 320.

Step 506 of the method 500 involves determining whether to add one or more new reference data snapshots to the cache 320 based at least in part on the data requests 346. For example, a new reference data snapshot 334c may be added to the cache 320 when the difference between the timestamp in the most recent punctuation event 324a (which represents the latest point in time for which there is a valid reference data snapshot in the cache 320) and the timestamp that is associated with the most recent data request 346a sent by the compute processor 312 is less than a predefined threshold value (e.g., a loading threshold 350).

Step 508 of the method 500 involves receiving lookup requests 340 from the compute processor 312. As discussed above, when a cache lookup operation is performed for a particular data event, the compute processor 312 sends a lookup request 340 to the reference data manager 322.

Step 510 of the method 500 involves determining whether to delete one or more older reference data snapshots from the cache 320 based at least in part on the lookup requests 340. For example, a reference data snapshot 334a may be deleted from the cache 320 when the difference between the timestamp that is included in the most recent lookup request 340a that the compute processor 312 sends to the reference data manager 322 and the end time of the valid time range associated with the reference data snapshot 334a is greater than a predefined threshold value (e.g., a cleanup threshold 356).

The techniques disclosed herein for performing a reference data join operation may provide significant improvements relative to known approaches. For example, in one known approach for joining an event stream with reference data, a cache is not utilized. Instead, a join operator receives all the reference data and performs the necessary manipulations. In other words, reference data may be treated as an internal state to join with data events in an event stream. However, this type of approach has the flaw of keeping a separate copy of the reference data for each join operation. This requires a significant amount of memory, particularly when the size of the reference data is quite large. In contrast, the techniques disclosed herein require significantly less memory because they do not require multiple copies of the entire set of reference data to be stored.

In accordance with another known approach that does not utilize a cache, input/output operations may be performed with respect to the reference data source itself. However, obtaining the reference data via a cache lookup operation, as disclosed herein, is significantly faster than performing input/output operations with respect to the reference data source itself, thereby reducing the amount of latency involved.

Another approach for joining an event stream with reference data utilizes a static cache. Such an approach does not suffer from the same memory or latency issues as the previous two approaches. However, one potential problem with a static cache is that the results of reference data join operations can be inaccurate when the underlying reference data changes. Dynamically updating the cache, as disclosed herein, provides accurate results while using memory efficiently and achieving low latency, even when the size of the reference data is quite large.

Figure 6:
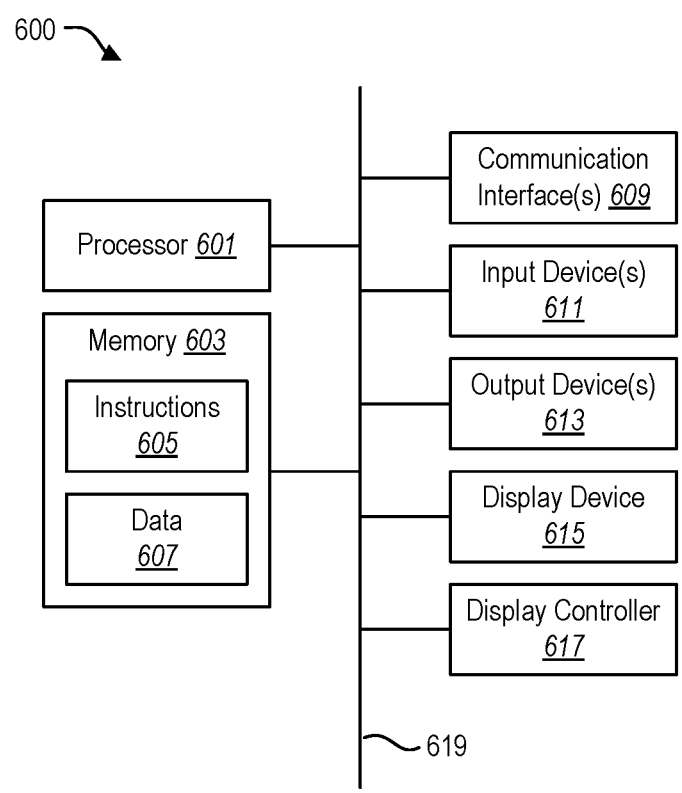
FIG. 6 illustrates certain components that may be included within a computing system in accordance with the present disclosure.

FIG. 6 illustrates certain components that may be included within a computing system 600 in accordance with the present disclosure.

The computing system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computing system 600 of FIG. 6, in an alternative configuration, a combination of processors (e.g., an ARM and DSP) could be used.

The computing system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor 601, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the methods, steps, operations, actions, or other functionality that is disclosed herein in connection with the computing system 600. For example, the instructions 605 may be executable by the processor 601 to implement the methods 400, 500 shown in FIGS. 4 and 5, respectively. Executing the instructions 605 may involve the use of the data 607 that is stored in the memory 603. Unless otherwise specified, any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

The computing system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing system 600 may also include one or more input devices 611 and one or more output devices 613. Some examples of input devices 611 include a keyboard, mouse, microphone, remote control device, button, joystick, trackball, touchpad, and lightpen. One specific type of output device 613 that is typically included in a computing system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615. The computing system 600 may also include other types of output devices 613, such as a speaker, a printer, etc.

The various components of the computing system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for joining an event stream with reference data, the method being implemented by a compute processor in an event stream processing system, the method comprising:
    sending a request to a reference data manager;
    receiving a punctuation event from the reference data manager in response to the request, wherein the punctuation event comprises a punctuation event timestamp, wherein the reference data manager determines the punctuation event timestamp by selecting a highest timestamp out of a plurality of timestamps associated with a plurality of reference data snapshots in a cache, and wherein the reference data manager causes at least one new reference data snapshot to be added to the cache when a difference between the highest timestamp out of the plurality of timestamps associated with the plurality of reference data snapshots in the cache and a timestamp that is associated with a most recent data request sent by the compute processor is less than a predefined threshold value;
    providing a logical barrier that restricts a flow of data events in the event stream to a cache lookup operation based on the punctuation event;
    performing a first cache lookup operation with respect to a first data event in the event stream, the first data event having a first timestamp that is earlier than the punctuation event timestamp; and
    delaying a second cache lookup operation from being performed with respect to a second data event in the event stream, the second data event having a second timestamp that is later than the punctuation event timestamp.

2. The method of claim 1, wherein providing the logical barrier comprises performing a temporal union between the punctuation event and the event stream.

3. The method of claim 1, wherein each data event in the event stream having a timestamp that is less than or equal to the punctuation event timestamp is permitted to cross the logical barrier.

4. The method of claim 1, wherein each data event in the event stream having a timestamp that is greater than the punctuation event timestamp is prevented from crossing the logical barrier.

5. The method of claim 1, further comprising dynamically updating contents of the cache based on processing of data events in the event stream.

6. The method of claim 1, wherein:
a plurality of punctuation events are supplied to the compute processor by the reference data manager in response to a plurality of data requests sent by the compute processor; and
the method further comprises determining whether to add one or more new reference data snapshots to the cache based at least in part on the plurality of data requests.

7. The method of claim 1, further comprising determining whether to delete one or more older reference data snapshots from the cache based at least in part on lookup requests that the compute processor sends to the reference data manager as part of the cache lookup operation.

8. The method of claim 7, wherein a reference data snapshot is deleted from the cache when a difference between a timestamp that is included in a most recent lookup request that the compute processor sends to the reference data manager and an end time of a valid time range associated with the reference data snapshot is greater than a predefined threshold value.

9. A computer-readable medium comprising instructions that are executable by a compute processor in an event processing system to:
send a request to a reference data manager;
receive a punctuation event from the reference data manager in response to the request, wherein the punctuation event comprises a punctuation event timestamp, wherein the reference data manager determines the punctuation event timestamp by selecting a highest timestamp out of a plurality of timestamps associated with a plurality of reference data snapshots in a cache, and wherein the reference data manager causes at least one new reference data snapshot to be added to the cache when a difference between the highest timestamp out of the plurality of timestamps associated with the plurality of reference data snapshots in the cache and a timestamp that is associated with a most recent data request sent by the compute processor is less than a predefined threshold value;
provide a logical barrier that restricts a flow of data events in an event stream to a cache lookup operation based on the punctuation event;
perform a first cache lookup operation with respect to a first data event in the event stream, the first data event having a first timestamp that is earlier than the punctuation event timestamp; and
delay a second cache lookup operation from being performed with respect to a second data event in the event stream, the second data event having a second timestamp that is later than the punctuation event timestamp.

10. The computer-readable medium of claim 9, wherein the instructions that are executable by the compute processor to provide the logical barrier comprise instructions that are executable by the compute processor to perform a temporal union between the punctuation event and the event stream.

11. The computer-readable medium of claim 9, wherein each data event in the event stream having a timestamp that is less than or equal to the punctuation event timestamp is permitted to cross the logical barrier.

12. The computer-readable medium of claim 9, wherein each data event in the event stream having a timestamp that is greater than the punctuation event timestamp is prevented from crossing the logical barrier.

13. The computer-readable medium of claim 9, further comprising additional instructions that are executable by the compute processor to dynamically update contents of the cache based on processing of data events in the event stream.

14. The computer-readable medium of claim 9, wherein:
a plurality of punctuation events are supplied to the compute processor by the reference data manager in response to a plurality of data requests sent by the compute processor; and
the computer-readable medium further comprises additional instructions that are executable by the compute processor to determine whether to add one or more new reference data snapshots to the cache based at least in part on the plurality of data requests.

15. The computer-readable medium of claim 9, further comprising additional instructions that are executable by the compute processor to determine whether to delete one or more older reference data snapshots from the cache based at least in part on lookup requests that the compute processor sends to the reference data manager as part of the cache lookup operation.

16. The computer-readable medium of claim 15, wherein a reference data snapshot is deleted from the cache when a difference between a timestamp that is included in a most recent lookup request that the compute processor sends to the reference data manager and an end time of a valid time range associated with the reference data snapshot is greater than a predefined threshold value.

17. An event processing system that is configured to join an event stream with reference data, comprising:
one or more processors;
memory in electronic communication with the one or more processors; and
instructions stored in the memory, the instructions being executable by the one or more processors to:
send a request to a reference data manager;
receive a punctuation event from the reference data manager in response to the request, wherein the punctuation event comprises a punctuation event timestamp, wherein the reference data manager determines the punctuation event timestamp by selecting a highest timestamp out of a plurality of timestamps associated with a plurality of reference data snapshots in a cache, and wherein the reference data manager causes at least one new reference data snapshot to be added to the cache when a difference between the highest timestamp out of the plurality of timestamps associated with the plurality of reference data snapshots in the cache and a timestamp that is associated with a most recent data request sent by the compute processor is less than a predefined threshold value;
provide a logical barrier that restricts a flow of data events in the event stream to a cache lookup operation based on the punctuation event;
perform a first cache lookup operation with respect to a first data event in the event stream, the first data event having a timestamp that is earlier than the punctuation event timestamp; and
delay a second cache lookup operation from being performed with respect to a second data event in the event stream, the second data event having a second timestamp that is later than the punctuation event timestamp.

18. The system of claim 17, wherein the instructions that are executable by the one or more processors to provide the logical barrier comprise instructions that are executable by the one or more processors to perform a temporal union between the punctuation event and the event stream.

\* \* \* \* \*